United States Patent
Mullhaupt et al.

(10) Patent No.: US 6,444,014 B1
(45) Date of Patent: Sep. 3, 2002

(54) VPSA PROCESS USING ADSORBENT MATERIALS

(75) Inventors: Joseph Timothy Mullhaupt, Williamsville; Frank Notaro, Amherst, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/622,867

(22) PCT Filed: Feb. 26, 1999

(86) PCT No.: PCT/US99/04388

§ 371 (c)(1),
(2), (4) Date: Nov. 13, 2000

(87) PCT Pub. No.: WO91/43417

PCT Pub. Date: Sep. 2, 1999

Related U.S. Application Data (60) Provisional application No. 60/076,257, filed on Feb. 27, 1998.

(51) Int. Cl.[7] .................................................. B01D 53/04
(52) U.S. Cl. ................................ 95/130; 95/96; 95/902; 96/111; 96/130; 96/143
(58) Field of Search ....................... 95/96–98, 100–105, 95/130, 902; 96/108, 111, 130, 143, 144

(56) References Cited

U.S. PATENT DOCUMENTS

| | | | |
|---|---|---|---|
| 4,859,217 A | 8/1989 | Chao | 55/68 |
| 5,071,449 A | 12/1991 | Sircar | 55/26 |
| 5,074,892 A | 12/1991 | Leavitt | 55/25 |
| 5,122,164 A | 6/1992 | Hirooka et al. | 55/26 |
| 5,176,721 A | 1/1993 | Hay et al. | 55/25 |
| 5,258,060 A | 11/1993 | Gaffney et al. | 95/101 |
| 5,266,102 A | 11/1993 | Gaffney et al. | 95/103 |
| 5,529,610 A | 6/1996 | Watson et al. | 95/100 |
| 5,672,195 A | 9/1997 | Moreau et al. | 95/96 |
| 5,674,311 A | 10/1997 | Notaro et al. | 95/96 |
| 5,711,787 A | 1/1998 | Neill et al. | 95/96 |
| 5,716,427 A | 2/1998 | Andreani et al. | 95/90 |
| 5,769,928 A | 6/1998 | Leavitt | 95/95 |
| 5,868,818 A | 2/1999 | Ogawa et al. | 95/96 |
| 5,891,218 A | 4/1999 | Rouge et al. | 95/96 |

Primary Examiner—Robert H. Spitzer
(74) Attorney, Agent, or Firm—Robert J. Follett (57) ABSTRACT

The invention relates to the use of adsorbent materials that have been selected on the basis of their relationship between that material's intrinsic rate and equilibrium properties.

19 Claims, 6 Drawing Sheets

VPSA PROCESS USING ADSORBENT MATERIALS

This application claims priority from Provisional application Ser. No. 60/076,257, filed Feb. 27, 1998.

FIELD OF THE INVENTION

The invention relates to adsorbent materials used in pressure swing adsorption (PSA) processes. More particularly, this invention relates to PSA processes for the production of high purity oxygen (e.g. oxygen having a purity of 90–95 vol. %$O_2$). More particularly, the invention relates to the selection of adsorbent materials for use in PSA processes. More particularly, the invention relates to the adsorbent materials which have been selected on the basis of related combinations of their intrinsic adsorption rate and adsorption equilibrium properties.

BACKGROUND OF THE INVENTION

There has been significant development of the various PSA, VSA and VPSA methods for air separation over the past thirty years, with major advances occurring during the last decade. Commercialization of these processes and continued extension of the production range can be attributed primarily to improvements in the adsorbents and process cycles, with-advances in adsorber design contributing to a lesser degree. Conventional adsorbents for PSA $O_2$ are $N_2$-selective at equilibrium and include 13X, CaA, CaX, and mixtures of CaA and CaX, for example. Advanced adsorbents have improved equilibrium properties such as high $\Delta N_2$ loading (e.g. working capacity), high nitrogen/oxygen selectivity and high capacity. Highly exchanged lithium molecular sieve adsorbents, as illustrated by Chao in U.S. Pat. No. 4,859,217, typify such advanced adsorbents for $O_2$ production.

Improving process efficiency and reducing the cost of the light component product can be accomplished by decreasing the amount of adsorbent required and by increasing the product recovery. The former is generally expressed in terms of bed size factor (BSF) in pounds adsorbent/TPDO (ton per day of contained $O_2$), while the latter is simply the fraction of light component in the feed that is captured as product.

Improvement in adsorbents and reduction in cycle time are two primary methods of reducing BSF. While shorter cycles lead to shorter beds and higher adsorbent utilization, product recovery generally suffers unless adsorption rate is increased. This phenomenon can be ideally characterized in terms of the size of the mass transfer zone (MTZ), i.e. the mass transfer zone becomes an increasing fraction of the adsorbent bed as the bed depth decreases. Since the adsorbent utilization with respect to the heavy component is much lower in the MTZ than in the equilibrium zone, working capacity (e.g. $\Delta N_2$ loading) declines as this fraction increases.

Attempts have been made to correlate the adsorbent materials properties more explicitly with their performance in process cycles. The well-known increases in mass transfer rates available with smaller adsorbent particles have been included in cycle improvements: (1) with dual, separated adsorption layers by Sircar (U.S. Pat. No. 5,071,449), (2) with short cycle times and sequenced steps by Hirooka et. al. (U.S. Pat. No. 5,122,164), and (3) in beds of different particle sizes with cross flow of gas by Hay et. al. (U.S. Pat. No. 5,176,721). Gaffney et. al. have used cycle studies to identify ranges of practical value for combinations of equilibrium materials properties: (1) isothermal working capacity and amount of inert diluent (U.S. Pat. No. 5,258,060) and (2) isothermal working capacity with selectivity (U.S. Pat. No. 5,266,102).

These examples of prior art typify two approaches in the correlation of equilibrium-selective adsorbent materials properties with process performance. In the first approach, the adsorbent composition. is taken as fixed, then mass transport is considered separately and accommodated by adjustments in particle size and bed design. In the second approach, the adsorbent composition is varied to alter equilibrium properties, then mass transport is measured, if it is considered at all.

Finally, Moreau et al. (U.S. Pat. No. 5,672,195) has suggested higher porosity in zeolites to achieve improved $O_2$ yield and throughput in PSA air separation. A preferred porosity range of 0.38 to 0.60 is claimed in conjunction with a minimum rate coefficient. Moreau et al. state that commercially available zeolites are not suitable for their invention since porosity is lower than 0.36. Moreau et al. fail to address the significant offsetting effects of high porosity.

OBJECTS OF THE INVENTION

It is therefore an object of the invention to provide for a PSA process having improved performance characteristics.

It is a further object of the invention to improve PSA process performance via the use of enhanced adsorbent materials.

It is a further object of the invention to improve PSA process performance through the use of adsorbent materials having improved intrinsic sorption rate characteristics.

It is a further object of the invention to improve PSA performance through the use of adsorbent materials having intrinsic sorption rates that are correlated with the adsorbent material's equilibrium characteristics.

It is a further object of the invention to provide a process for selecting adsorbents for PSA processes.

SUMMARY OF THE INVENTION

The invention relates to the use of adsorbent materials that have been selected on the basis of preferred and related combinations of their intrinsic adsorption rate and adsorption equilibrium properties.

BRIEF DESCRIPTION OF DRAWINGS

Other objects, features and advantages will occur to those skilled in the art from the following description of preferred embodiments and the accompanying drawings, in which.

DETAILED DESCRIPTION OF THE INVENTION

This invention arises in part out of the recognition that intrinsic sorption rate properties are not invariant amongst various adsorbents, nor are they invariant for a given adsorbent subjected to variations in manufacturing conditions and/or conditions.

By the term "sorption rate" we mean the rate at which the adsorbate loading changes in a given time period in an adsorbent particle for a given adsorption separation process. This sorption rate is approximately proportional to the inverse of (particle diameter)$^2$ and is directly proportional to the "intrinsic sorption rate" (also referred to as the "intrinsic rate"). By the term "intrinsic rate" we mean the sorption rate that is due to the intrinsic properties of an adsorbent particle including, but not limited to, pore size and/or distribution within a particle. A material's intrinsic rate is independent of particle size. The term "relative rate" is a comparative measure of "sorption rate" and the term "size-compensated relative rate" (SCRR) is a measure of the intrinsic sorption rate.

Further, we have found that combining this rate property with an adsorbent's equilibrium characteristics is critical to achieving the full performance potential of high capacity adsorbents which has not heretofore been achieved due to mass transfer limitations. In other words, even though a material may have a large capacity for retaining adsorbate, such capacity has not heretofore been effectively utilized due to the fact that the mass transfer of the adsorbate in the adsorbent is inadequate and/or is not correlated to that capacity.

Intrinsic sorption rate is dependent upon both the nature of the material (e.g. composition), as well as its form (e.g. morphology of the material). Thus one may improve the intrinsic sorption rate of materials of particular composition (e.g. LiX(2.3)$\geq$88% Li, where 2.3 is the mole ratio of $SiO_2$ to $Al_2O_3$) by modifying their morphology. Consequently, the invention is applicable to any type of equilibrium-selective adsorbent material including, but not limited to, A-zeolite, X-zeolite, Y-zeolite, chabazite, mordenite, and various ion exchanged forms of these, as well as silica-alumina, alumina, silica, titanium silicates, phosphates and mixtures thereof. Further, the intrinsic sorption rate of materials should be considered in tandem with the equilibrium properties of the material (e.g. $\Delta N_2$ loading and selectivity for nitrogen over oxygen). In sum, the present invention provides a methodology for selecting adsorbents for use in a PSA process by providing new fundamental criteria for evaluating adsorbents. This methodology eliminates the need for the extensive and time-consuming testing: (1) of materials properties (e.g. measurement of adsorption equilibria for $O_2$ and $N_2$) and (2) of process cycle parameters, such as $O_2$ recovery and bed size factors common in the prior art.

The essence of our invention is the recognition that both intrinsic sorption rate and equilibrium properties should be considered in the selection of particular adsorbents in PSA systems. In particular, we define a relationship between these two parameters such that for given equilibrium properties (e.g. working capacity), there is a corresponding minimum adsorption rate that provides for effective utilization of that capacity. Such recognition and relationship has not heretofore been recognized in the art.

In accordance with the invention, sorption rates for a given adsorbent are defined by the following equation (1). The equation relates to the point in a PSA process cycle at which the feed gas is admitted to the regenerated adsorbent. This equation considers both the adsorption of $N_2$ from the gas phase and the concomitant desorption of $O_2$ from the adsorbent. In the laboratory experiment described below, the feed gas is clean, dry, $CO_2$-free air, and the regeneration gas is $O_2$ From that experiment, we define the relative rate "RR" at the total pressure "p" as $$RR(p)=[\Delta N_2(Y_F, Y_0)]/(t_2-t_1) \quad \text{(eqn. 1)},$$

where the $\Delta N_2$ (the numerator in equation 1), is given by $$\Delta N_2(Y_F, Y_0)=[N_2 \text{ Loading at p}, Y_F]-[N_2 \text{ Loading at p}, Y_0] \quad \text{(eqn. 2)}$$

in which $Y_F=0.20$, $Y_0=1.0$, $Y_1=0.90$, and $Y_2=0.30$, are mole fractions of $O_2$ in the gas phase; and $t_1$ and $t_2$ are the times corresponding to $Y_1$ and $Y_2$ in the concentration front. $Y_F$ and $Y_0$ refer to the feed and regeneration gases, respectively; $Y_1$ and $Y_2$ refer to selected compositions on the breakthrough curve.

In order to account for the effects of particle size, the size-compensated relative rate "SCRR" is defined at the total pressure "p" as $$SCRR(p)=RR(p)*[d_{particle}]^2 \quad \text{(eqn. 3)},$$

where "$d_{particle}$" is the Ergun particle diameter derived from the particle size distribution. Those skilled in the art will recognize that the relative rate RR is a measure of the amount of gas adsorbed in a bed of particles over a given time. The definition of SCRR allows one to account for the explicit dependence on particle size and focus on the dependence upon intrinsic rate.

Figure 1:
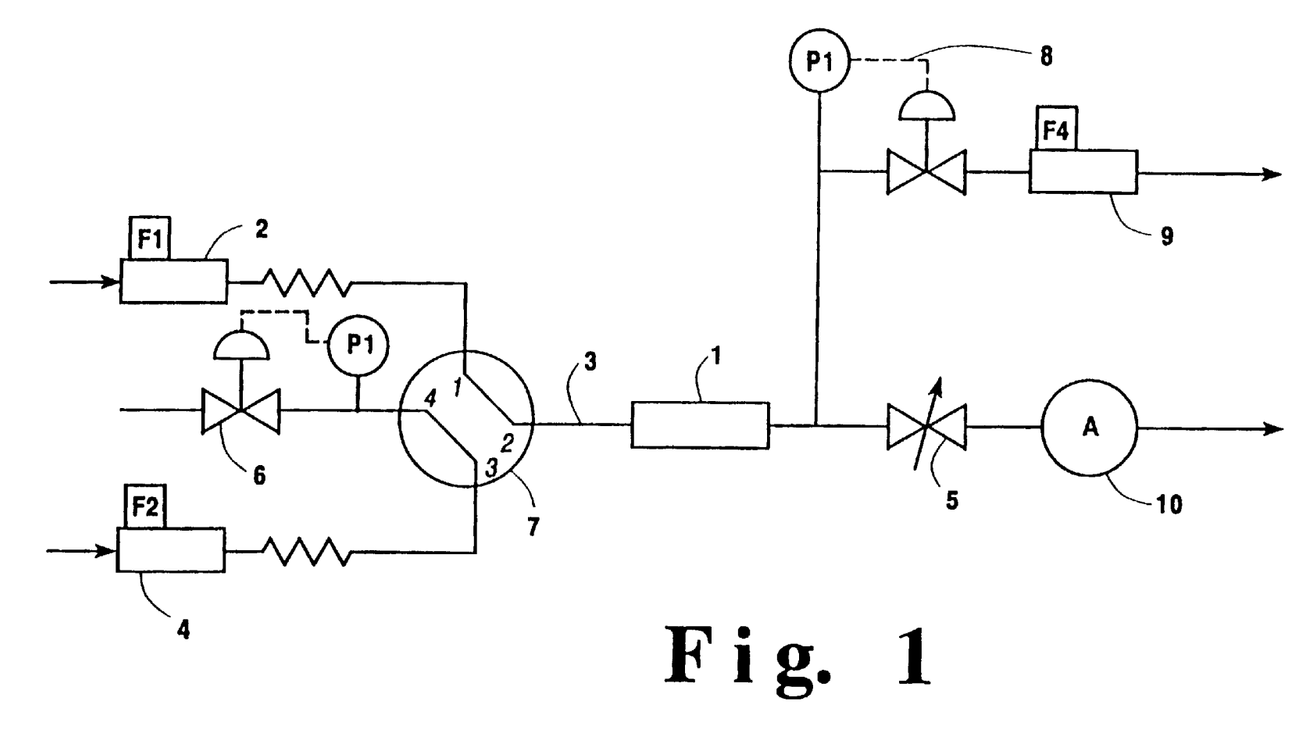
FIG. 1 is a schematic diagram of an apparatus used to measure intrinsic adsorption rate of an adsorbent.

Experiments to measure the data needed to calculate RR (mmol/g sec) and SCRR (mmol mm$^2$/g sec) may be performed in a volumetric flow apparatus as described in FIG. 1. In particular, a breakthrough test is performed in two steps in which the flow rate, pressure and temperature of the feed gas are the same in both steps. With reference to FIG. 1, this process will be described. The first step involves saturation of the adsorbent bed 1 with $O_2$ the less selective component, provided via flow meter 2 and line 3. In the second step, air or a synthetic air mixture containing $N_2$ and $O_2$ is then introduced to bed 1 via flow meter 4 and line 3 in step two. Valve 6 operates in conjunction with flow meter 2 such that pressure of the air or synthetic air is maintained in an external loop until four port valve 7 connects the air/synthetic air feed to line 3 such that the air/synthetic air flows into bed 1. The pressure, temperature and composition of the feed mixture in the second step should be representative of that in an adsorption step of an actual process, e.g. 1.5 bar, 300° K and feed air composition. The molar flux was approximately 10 mol/m$^2$s. The pressure is maintained substantially constant in the bed 1 by using a control valve 8 located on the downstream side of the adsorbent bed. The endspace and connecting piping volumes (dead volumes) are designed to be about 5% or less than that of the adsorbent bed volume.

The flow rate and concentration of $O_2$ are continuously and accurately monitored throughout step two via flow meter 9 and oxygen analyzer 10 until the breakthrough of $N_2$ is complete. Flow to analyzer 10 is maintained at a fixed amount via fixed valve 5. In step two, the more selectively adsorbed $N_2$ displaces the adsorbed $O_2$ already in the bed 1. As the bed nears saturation with the air mixture, the breakthrough of $N_2$ is reflected in a decrease in the $O_2$ concentration and an increase in overall flow rate of the effluent from the bed. The piping and adsorbent bed are maintained at the same temperature as the feed by immersing them in a thermostat bath controlled at the same temperature as the feed.

The relative rate and SCRR are determined from the results of this test. The differential loading (appearing in equation 2) of N2 is determined from an analysis of the breakthrough results. The T2–T1 in equation (2) is determined directly from the oxygen concentration front measured at the exit of the test bed (using oxygen analyzer 10). The relative rate calculated from equation 2 is used in equation 1 with the particle size information to determine SCRR.

For the particular measurements disclosed herein, rate data were obtained with samples in an activated state. Adsorbents were maintained under dry $N_2$ to preserve the state of activation.

Those skilled in the art will recognize that the 2-step method set forth above provides an example of one means for generating a concentration breakthrough curve and $\Delta N_2$ loadings from which RR can be derived. The method yields reproducible values that relate to the feed step in pilot-scale tests representative of an actual process. The experiment is designed to minimize the major sources of error such as mixing losses and temperature gradients.

We should note that for the purposes of the invention, samples may be tested in various states of activation, corresponding to the state of samples as they are prepared commercially, or with further activation to approximate the vacuum activated state used for equilibrium measurements.

To characterize the equilibrium properties of an adsorbent at conditions relevant to an air separation cycle, a definition based on measurements of adsorption isotherms of the individual gases $N_2$ and $O_2$ is used. The definition is referred to as the NML Figure of Merit ("NML FoM"). The NML FoM is defined as follows:

$$\text{NML FoM} \square [\Delta N_2(T, B)]*[\alpha_T(N_2/O_2)]^2/[\alpha_B(N_2/O_2)] \quad \text{(eqn. 4)}$$

where the subscripts "T" & "B" refer to the "top" and "bottom" pressures, correspond to the highest adsorption and lowest desorption pressures, respectively. The $\Delta N_2$ loading between top and bottom pressures and compositions is given by the expression:

$$\Delta N_2(T, B) = [N_2 \text{ Loading at } p_T, X_T] - [N_2 \text{ Loading at } P_B, X_B] \quad \text{(eqn. 5)}$$

The separation factors at the top and bottom pressures and compositions are defined, respectively, in the following two equations which assume constant temperature:

$$\alpha T(N_2/O_2) = [X_T(N_2)/X_T(O_2)]/[Y_T(N_2)/Y_T(O_2)] \quad \text{(eqn. 6)}$$

and $$\alpha_B(N_2/O_2) = [X_B(N_2)/X_B(O_2)]/[Y_B(N_2)/Y_B(O_2)] \quad \text{(eqn. 7)}.$$

In equations 5, 6, and 7, $X_T$ and $X_B$ are mole fractions of the indicated molecules in the adsorbed phase at the pressure denoted by the subscript, while $Y_T$ and $Y_B$ are mole fractions of the indicated molecules in the gas phase at the pressure denoted by the subscript. The values of $\Delta N_2(Y_F, Y_O)$, from equation 2, and $\Delta N_2(T,B)$, from equation 4, are approximately equal at equal temperatures. However, $\Delta N_2(Y_F, Y_O)$ is obtained from mixed adsorption data in a rate experiment, while $\Delta N_2(T,B)$ is calculated from pure gas equilibrium data.

As can be seen from the above definition, the NML FoM (mmol/g) is a product of three factors, each of which contributes to equilibrium performance. The first, $\Delta N_2$ loading, is a measure of the maximum amount of $N_2$ that can be separated in the cycle. The second, $\alpha_T$, is a measure of the selectivity in the feed step. The third, $[\alpha_T/\alpha_B]$, accounts for the deleterious effects of selectivity during regeneration relative to the feed selectivity.

Experiments to measure the adsorption data needed to calculate the parameters of NML FoM were performed in a pressure microbalance capable of pressures in the range $10^{-4}$ torr to 500 psia, controlled adsorption temperatures from 250 K to 340 K, and activation temperatures to 500° C. Isothermal adsorption data were obtained with the individual pure gases $N_2$ and $O_2$ after in situ sample activation. The gravimetric method utilized involved sample vacuum activation at $10^{-4}$ torr and 350° C. for 16 hrs, corrections for buoyancy effects, and the determination of equilibrium loadings by approaching them from both higher and lower pressures. Isotherms were mapped at pressures below 6 atm.

The adsorption data were transformed via a three term Loading Ratio Correlation (LRC) to conditions that approximated equilibrium at points in the process cycle corresponding to maximum and minimum $N_2$ loadings of the adsorbent (e.g. the "top" and "bottom" pressures, respectively). Mixed adsorption data required for the NML FoM were then calculated using the LRC for mixed adsorption. The conditions at the "top" pressure of the cycle used were: Temp=300 K, $p_T$=150 kPa, $Y_T(O_2)$=0.20, $Y_T(N_2)$=0.80. The conditions at the "bottom" pressure are: Temp=300 K, $p_T$=35 kPa, $Y_T(O_2)$=0.05, $Y_T(N_2)$=0.95.

Those skilled in the art will recognize that there are other methods to measure the parameters required in equation 4.

The combinations of these materials parameters can be correlated with values of recovery and productivity (inverse BSF) obtained from a pilot-scale PSA ($O_2$) plant. The values of $O_2$ recovery and bed size factor in the pilot test can, in turn, be correlated to values obtained from commercial-scale practice, and thus arrive at a correlation with product cost represented by the curves of constant performance in FIG. 6. Alternatively, these same combinations of parameters can be correlated directly to historical cost performance corresponding to adsorbents which exhibit a given parameter combination, provided sufficient data exist to construct the correlation.

The methodology of the present invention may be used to explain past adsorbent performance improvements, and to predict means for improving performance. As an example of the former, equilibrium properties have been improved in prior art through the use of highly-exchanged LiX zeolites in place of NaX materials and/or through the use of lower $SiO_2/Al_2O_3$ ratio materials, e.g., X(2.3) vs. X(2.5). These improvements are consistent with the data presented in FIG. 6 (as will be discussed below).

It is recognized in the prior art that increased sorption rates are attained by reduction in particle diameter, usually at the expense of pressure drop. In accordance with the teachings of this invention, we can achieve the desired high adsorption rates by increasing the adsorbent particle's intrinsic rate. The process sorption rate is thus increased without the usual penalty of pressure drop.

Tables 1 and 2 show the magnitude of the pressure drop effect which may be encountered by having to achieve the equivalent SCRR by reduction in adsorbent particle diameter. Those increases in pressure drop act to decrease process performance, thus at least partially offsetting any gains made by the increased process sorption rate. Therefore it is preferred to improve performance by increasing SCRR rather than by decreasing adsorbent particle diameter. However, one may also improve performance for a given material having a particular FoM by increasing SCRR and controlling the particle diameter. The invention ultimately allows for greater process cycle flexibility resulting in smaller beds, smaller pressure drops, and shorter cycles for a given adsorbent and particle diameter, ultimately leading to lower capital and power costs.

TABLE 1

Comparison of Intrinsic Rate and Particle Size Effects
For Achieving Faster Relative Rates

| Relative Rate "RR" | SCRR for Particle Diameter Fixed at 1.8 mm | Ergun Diameter (mm) for SCRR Fixed at 0.64 |
|---|---|---|
| 0.2 | 0.64 | 1.8 |
| 0.31 | 0.8 | 1.61 |
| 0.48 | 1 | 1.44 |
| 0.69 | 1.2 | 1.32 |
| 0.94 | 1.4 | 1.22 |
| 1.23 | 1.6 | 1.14 |

Note:
In columns 2 and 3, first row values are derived directly from experimental data. Values in succeeding rows are calculated using equation 3.

TABLE 2

Effect of Particle Size on Pressure Drop
Calculated from the Ergun Equation

| Ergun Diameter (mm) | Pressure Drop (mbar) |
|---|---|
| 1.8 | 87 |
| 1.61 | 101 |
| 1.44 | 119 |
| 1.32 | 136 |
| 1.22 | 152 |
| 1.14 | 1.68 |

Note:
Ergun equation for pressure drop has the form $\Delta p/L = A + B$ where $A = [150 * \mu * v/(d_{particle})^2] * [(1-\phi^2/\phi^3)]$ $B = [1.75 * \rho * v^2/d_{particle}] * [(1-\phi/\phi^3)]$ constants in the calculation:

L=bed length—100 cm $\mu$=viscosity at 300 K=$1.846 \times 10^{-4}$ poise v=frontal velocity—50 cm/sec $\phi$=bed void fraction=0.37

$\rho$=gas density at 300 K and 1.5 atm=$1.766 \times 10^{-3}$ g/cm$^3$

Independent variable values $d_{particle}$=particle diameter (cm)

dependent variable values:

$\Delta p$=pressure drop (g/cm-sec2)

Pressure drop (mbar)=$\Delta p/1000$

Equation Reference:

F.A.L. Dullien "Porous Media—Fluid Transport and Pore Structure Academic Press, New York (1979)

The process of identifying, selecting, or attaining superior-performing adsorbents for air separation processes involves correlating relationships between the intrinsic sorption rates and equilibrium properties of particular adsorbent materials with process characteristics such as product recovery and Bed Size Factor (BSF) attained from the use of such materials. Those skilled in the arc will appreciate that such process characteristics may be determined via actual experiments on a PSA ($O_2$) pilot plant, or via modeling.

For the purposes of this invention, data were correlated via performance measurements from a pilot plant. The pilot plant used comprises two cylindrical beds (each 3 inches in diameter), filled with adsorbent beads (8×12 mesh), typically to a height of 66 inches. The adsorbent is used in an activated condition, and is handled under dry $N_2$ to preserve that state. The plant is operated at ambient temperature to produce product at 90% $O_2$ purity, using a top pressure of 150 kPa and a bottom pressure of 35 kPa. The steady-state operation of the unit is closer to isothermal than to adiabatic conditions, and the linear flow velocity was 1.3 normal ft$^3$/s–ft$^2$.

From the data recorded, two measures of separation efficiency are calculated for a product purity of 90% $O_2$: (1) $O_2$ recovery as percent of feed air, and (2) BSF, defined as the adsorbent weight (lb) to produce product at a rate of 1 ton/day for the cycle operating conditions.

Figure 2:
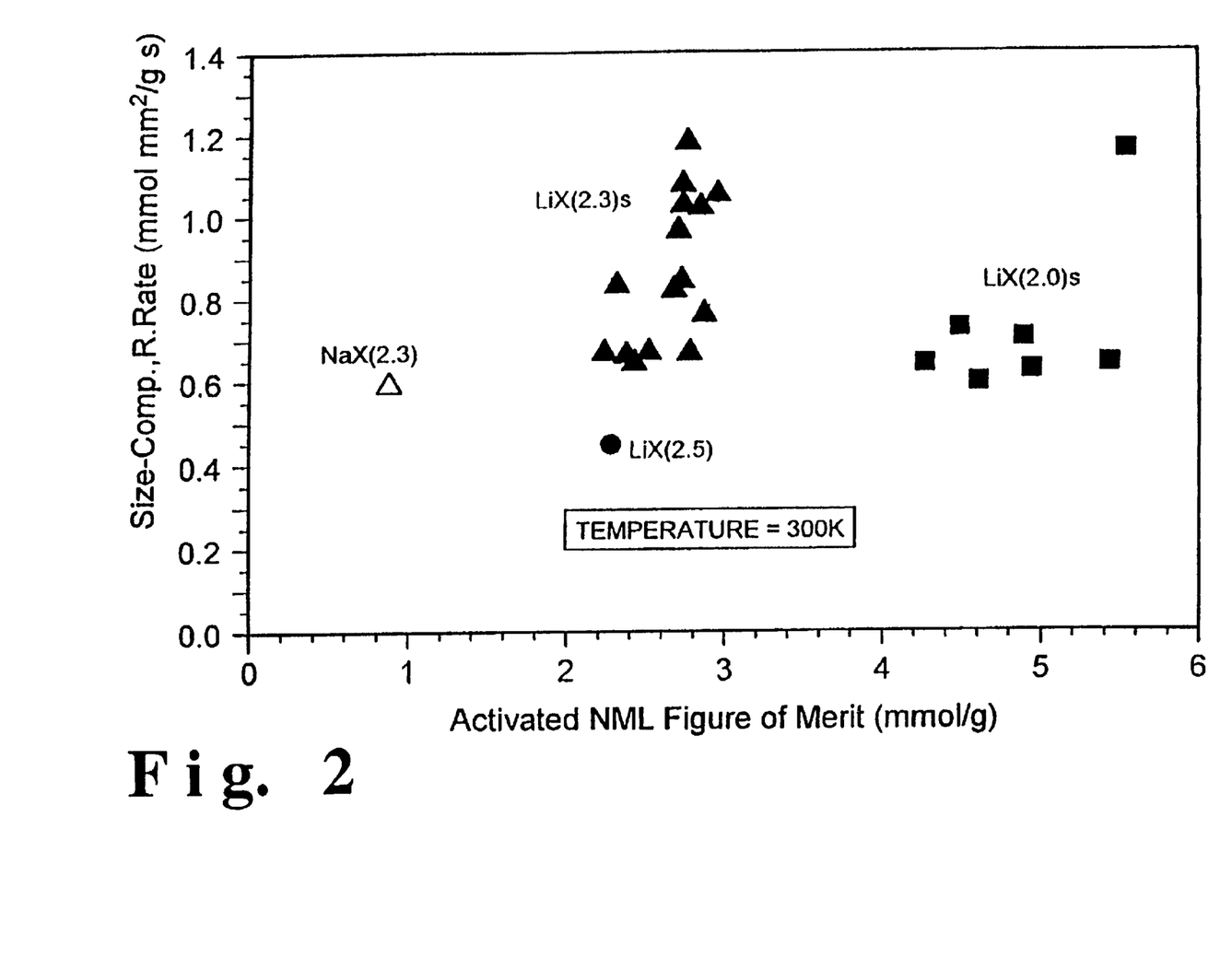
FIG. 2 is a graph of SCRR vs. NML FoM data for type X zeolite-based adsorbents.

SCRR and NML FoM data for 24 lots of zeolite-based adsorbents are presented in FIG. 2. All lots were obtained from UOP of Des Plaines, Ill. USA. Data for the samples of similar chemical compositions fall into groups having similar equilibrium properties according to the FoM. The lowest value shown is for NaX (2.3) (open triangle) (12% attagel binder). The remaining samples are LiX (12% attagel binder) with different $SiO_2/Al_2O_3$ ratios: circle X(2.5), triangles X(2.3), and squares X(2.0). The order with respect to FoM values is not unexpected. At SCRR values in the range of 0.55–0.75, for example, the pilot performance improves as equilibrium properties improve (e.g. the FoM increases).

However, the ordering within these groups with respect to rate characteristics (SCRR) shows that samples having similar equilibrium properties (e.g. closely spaced FoM values) may actually differ in SCRR values by a factor of two due to variations in manufacturing. Further, improved system (pilot) performance of these adsorbents also correlates with increasing SCRR. This supports the premise that forms the basis for the invention: that both intrinsic rate and equilibrium properties of an adsorbent material are significant parameters to be considered in order to improve PSA process performance.

Figure 3:
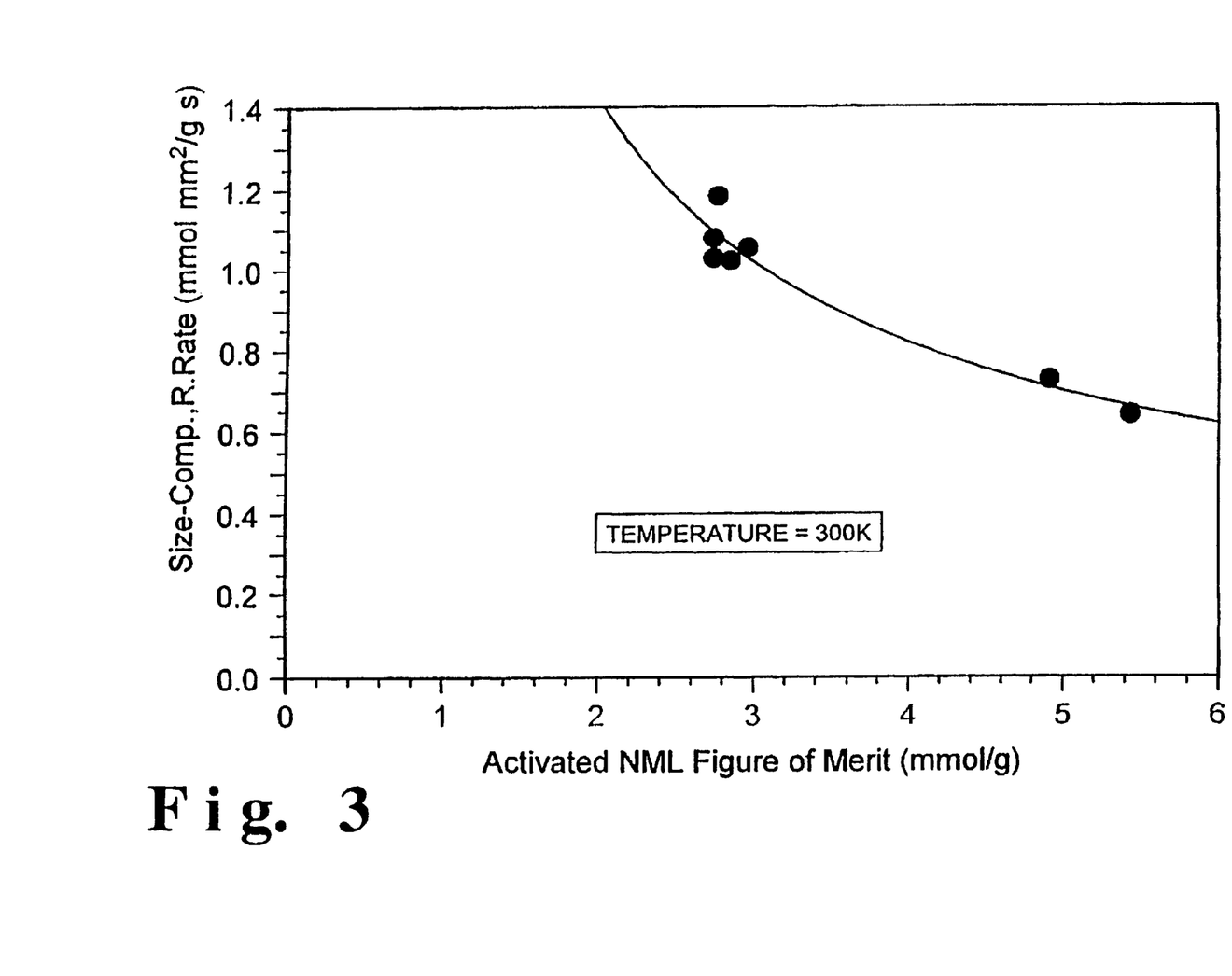
FIG. 3 is a graph of SCRR vs. NML FoM data and curve for materials numbered 1–7 in FIG. 2.

FIG. 3 shows the SCRR and FoM values for the seven best-performing samples selected from FIG. 2. For these seven samples, average values of normalized $O_2$ recovery equal to 0.893±0.019 and of normalized bed size factor equal to 1.211±0.074 were determined from pilot plant performance data. For the remaining samples, the corresponding averages of the normalized quantities were 0.840±0.060 for recovery and 1.303±0.173 for bed size factor.

The data in the two clusters of FIG. 3 were used to define a curve of the form $$(SCRR-d)*FoM=c \qquad (eqn. 8),$$

that is indicative of the relationship between rate and equilibrium properties. Two pairs of points from FIG. 3 were used to define the following equations:

$$(SCR_1-d)*FoM_1=c, \text{ and } (SCRR_2-d)*FoM_2=c.$$

These were solved simultaneously for values of "d" and "c". The value d=0.22 was retained for all the data, while the value of "c" expresses differences in performance, as described below.

It is critical to recognize that the relationship is not linear. For example, from the curve in FIG. 3, a material with FoM=3 and SCRR=1.0 would have the same predicted process plant performance as a material with FoM=5 and SCRR=0.7. Thus, rate and equilibrium may be traded for one another along this constant performance curve.

This non-linear relationship between intrinsic rate and equilibrium is not taught or suggested anywhere in prior disclosures.

FIG. 3 shows the hyperbolic curve for c=2.29, together with the 7 best performing materials. The constant "c" is a measure of the pilot plant performance actually obtained with a particular adsorbent material.

Figure 4:
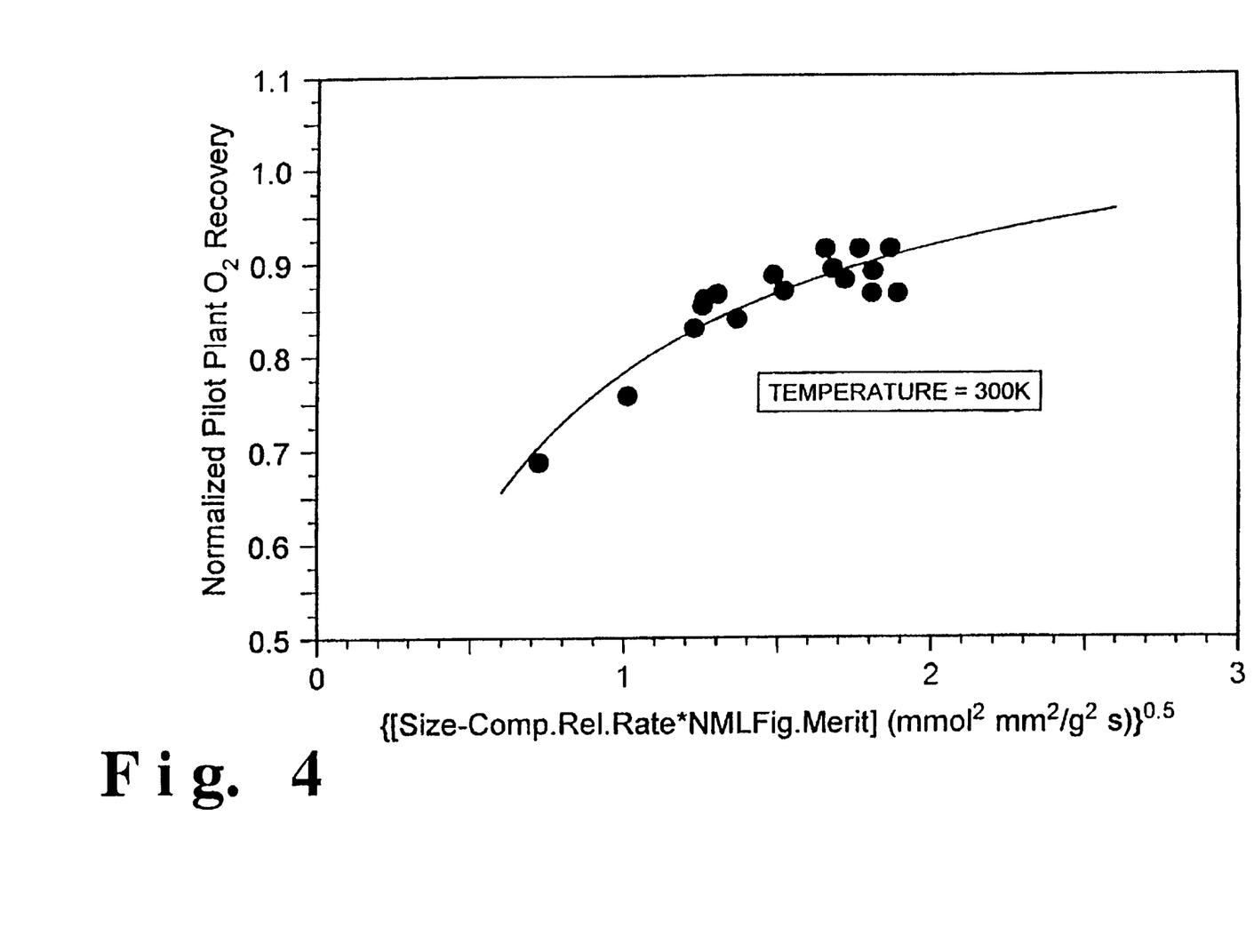
FIG. 4 is a graph of Normalized $O_2$ Recovery vs. [(SCRR)*(NML FoM)]$^{0.5}$.

The invention recognizes that materials of similar composition may have dramatically different performance due to a particular material's intrinsic rate. The relationships between the materials characteristics and pilot plant performance can be demonstrated more explicitly by examining the dependence of $O_2$ recovery and bed size factor on the constant "c", that is, on the product of SCRR and FoM. For example, the dependence of normalized $O_2$ recovery on $\sqrt{SCRR*FoM}$ is illustrated in FIG. 4.

Figure 5:
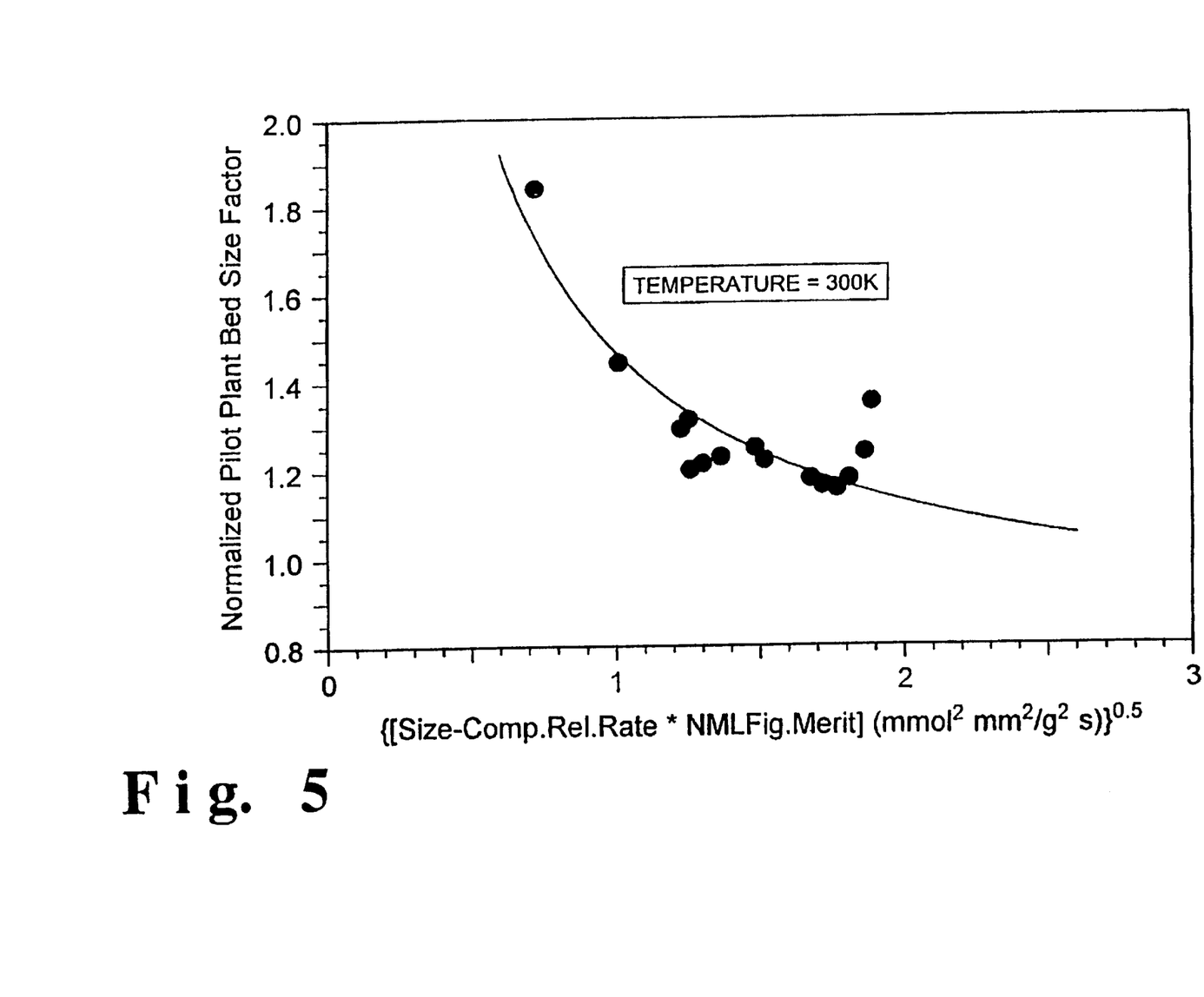
FIG. 5 is a graph of Normalized BSF vs. [(SCRR)*(NML FoM)]$^{0.5}$.

The increase of normalized $O_2$ recovery with increasing values of [SCRR*FoM] is clearly shown. The dependence of normalized bed size factor (inverse productivity) is shown in FIG. 5 for $\sqrt{SCRR*FoM}$. This figure shows clearly the decrease of normalized bed size factor with increasing values of [SCRR*FoM]. The behavior exhibited in these figures provides strong supporting evidence for the relationship in equation 8 and in FIG. 6.

The details of the relationships demonstrated graphically in the figures is dependent upon particular PSA plant conditions, (e.g. temperature, top and bottom pressures and feed compositions, as well as bed size and configuration, cycle steps and times, and gas flows. The general trends observed here will remain, but the numerical values will change.

The family of curves suggested by FIG. 2 and equation 8 can be transformed from pilot performance to relative product cost for PSA($O_2$) using relationships between pilot performance and commercial practice. The resulting relationship of commercial performance to materials characteristics is relatively independent of the details of cycle conditions.

Figure 6:
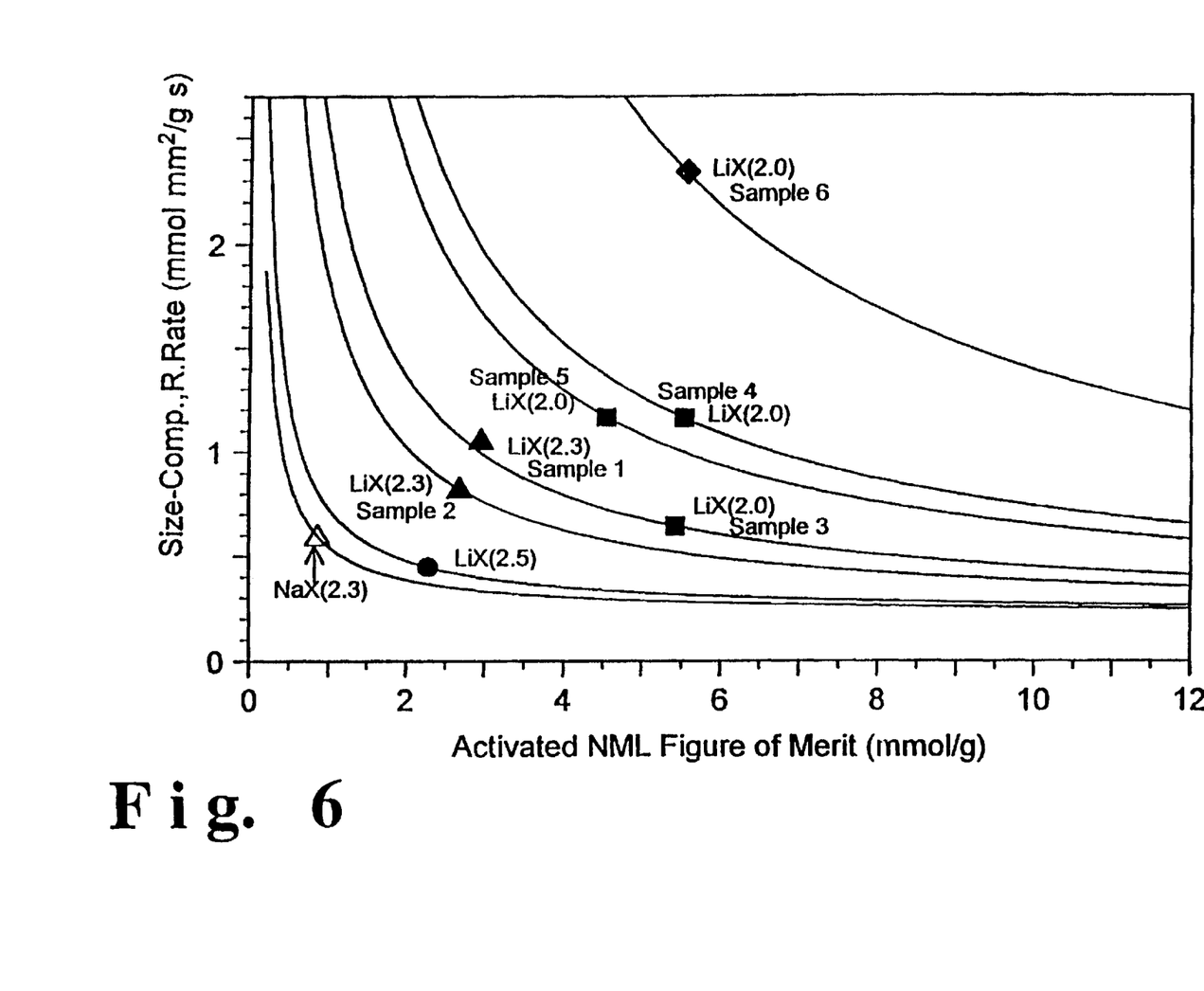
FIG. 6 is a plot of SCRR vs. NML FoM with Curves of Constant Relative PSA Product Cost

As can be seen from FIG. 6, it is possible that a material having lesser equilibrium properties (e.g. lesser NML FoM), but a higher SCRR may have the same performance as a material having greater equilibrium properties (e.g. greater NML FoM), but a lower SCRR.

In FIG. 6, the equations for the curves differ only in the value of "c". As indicated above, each curve with each value of "c", represents a constant overall performance. As "c" increases, overall product cost will decreased due to at least increased recovery and/or decreased BSF. For the purposes of the invention materials having a value of >2.5 are preferred; with values of >5 being more preferred; values of >8 being still more preferred; values of >10 being still more preferred and values of >11 being most preferred The data for FIG. 6 is as follows:

|  | SCRR | FoM | C |
|---|---|---|---|
| NaX (2.3) | .596 | .88 | .311 |
| LiX (2.5) | .447 | 2.28 | .52 |
| Sample 1: LiX (2.3) | 1.06 | 2.96 | 2.47 |
| Sample 2: LiX (2.3) | .82 | 2.68 | 1.61 |
| Sample 3: LiX (2.0) | .642 | 5.43 | 2.29 |
| Sample 4: LiX (2.0) | 1.16 | 5.54 | 5.2 |
| Sample 5: LiX (2.0) | 1.17 | 4.55 | 4.3 |
| Sample 6: LiX (2.0) | 2.37 | 5.57 | 11.8 |

NaX, and LiX(2.5) and Samples 1–5 all contain 12% attagel binder.

The relationship between NML FoM, SCRR, and performance shown in FIG. 6 applies directly to the adsorbent beds used in the pilot tests. The relationship is affected by the bed depth, by the adsorbent particle size, and by the gas flux rate. For the tests, the bed depth was 66 inches, and the Ergun particle diameter averaged about 1.9 mm. The flux rate was 1.3 normal $ft^3/s-ft^2$. This is the base case. For alternate conditions, the SCRR values are given approximately by the following equation:

$$SCRR_A = SCRR_B * (66/Z_A) * (D_{PA}/1.9)^{2} * (u_A/1.3) \quad (eqn.\ 9)$$

where:

$SCRR_A$ is the intrinsic rate for the alternate case, $SCRR_B$ is the intrinsic rate for the base case, $Z_A$ is the bed depth (inches) for the alternate case, $u_A$ is the flux rate in normal $ft^3/s-ft^2$, and $D_{PA}$ is the Ergun diameter (millimeters) for the alternate case.

For the alternate case, to achieve the same performance at a given NML FoM as is shown in FIG. 6, one must use the value of $SCRR_A$ calculated from equation 9, using the value of $SCRR_B$ from FIG. 6. One skilled in the art will also consider the effects of pressure drop.

As is clear from our defined relationship between rate and equilibrium properties $$(SCRR-0.22)*FoM=c,$$

the adsorbents may be improved in several ways. A preferred approach is to modify the adsorbent material (i.e., the zeolite or zeolite-like crystals.) Since this component controls adsorption, one may improve equilibrium properties by increasing one or more of the factors comprising the NML FoM: (1) $\Delta N_2$ loading, (2) $\alpha$—for the feed, (3) the ratio $[\alpha_T/\alpha_B]$ for regeneration.

Improved intrinsic rate may be obtained by manipulating specific formulations and/or the processing of adsorbents, described below. While not wishing to be bound to any theory, it is believed that such manufacturing methods would include modification of intercrystalline gas transport pores of an adsorbent material, including both their total volume, pore size distribution, pore length and tortuosity.

Examples of such formulations and/or processes include, the variation of binder content and type, caustic digestion of the binder, the inclusion and subsequent burn-out of fibers having selected dimensions, concentrations and compositions.

Adsorbents have been produced incorporating such methodologies such that the resulting SCRRs are significantly greater than those not produced according to the above parameters. Further, such increases have been achieved while maintaining the porosity within the desired range of conventional adsorbents. Indeed, the processes and formulations described above, particularly caustic digestion, may even decrease porosity, while increasing the SCRR. Particular parameters for the above are disclosed in co-filed, commonly assigned application D-20,658 (Chao), the contents of which are herein incorporated by reference.

A material that may be used in the practice of the invention is a 95% exchanged LiX(2.0) zeolite made according to the following non-limiting example. This material is identified as Sample 6 in FIG. 6.

EXAMPLE

To prepare a bonded product, 2640 g (dry weight) of dried and screened NaKX(2.0) and 360 g (dry weight) of kaolin clay were mixed together in a Simpson Mix-Muller. Water was pumped in at 10 ml/min for 15 min, then at 4 ml/min for 40 min. The mixture was mulled for another 20 min., after which it was transferred to a Nauta mixer (Hosokawa Micron DBY-10R) to convert the dough into beads. Before calcination, the beads were dried in air overnight. The beads were calcined in an oven in a thin bed configuration with dry air purge. Temperature was brought up to 600° C. in 2 hours and maintained at 600° C. for two hours. The calcined beads were then cooled down and sieved.

For the caustic digested material, 1861.8 g of 6×16 mesh NaKX(2.0) beads were treated with the digestion solution prepared in the following way. First, 360 g of NaOH and 251.1 g of KOH were dissolved in 7386 g of water. Second, 320 ml of "sacrificial", undigested beads were added to the solution, then heated with stirring at 90° C. for 2 hours. The mixture was allowed to settle, after which 6397.7 g of the supernatant liquid was recovered. Third, to this liquid was added 1477.2 ml water, 72.0 g NaOH, and 50.2 g KOH to replenish the discarded caustic. The undigested beads were loaded into two, stainless steel columns (diameter 3 inches). The digestion solution was pumped from a common reservoir through the columns at 30 ml/min at 88° C. for 26 hours. The beads in each column were then washed at 88° C., first with 40 liters of NaOH solution (pH=12), then with 30 liters of NaOH solution (pH=8.5). Finally, the digested product was air dried and screened.

The Li ion exchanged product was prepared as follows. 694.5 g (dry weight) of 8×12 mesh NaKX(2.0) caustic digested beads were charged to a heated glass column (diameter 3 inches). The ion exchange solution was preheated to 90° C. and de-aerated, then circulated through the column from the bottom at 15 ml/min for about 24 hours. The exchange solution was prepared by dissolving 2162 g LiCl in 80 liters of distilled water then adjusting the pH to 9 by adding LiOH solution. Typically, 10–12 times the stoichiometric amount of Li was used. After the exchange, the beads were washed by pumping, at 60 ml/min, 30 liters of preheated, distilled water having pH=9 (adjusted with LiOH). The washed product was then air dried.

Samples of the caustic-digested LiX(2.0) beads were activated in a vacuum system equipped with oil diffusion pump and liquid nitrogen trap. The sample was heated up to about 450° C. in 10 hours and maintained at 450° C. for about 6 hours. The activated sample was tested in the adsorption rate measuring apparatus described above. The material had the following properties:

Average Bead Diameter: 2.001 mm
Bulk density: 0.560 g/cm$^3$
Relative Rate: 0.327 mmol/g-s
SCRR: 2.371 mmol-mm$^2$/g-s
NML FoM (300 K): 5.57 mmol/g It is noted that there has been no disclosure in the prior art with respect to the fact that there is even a relationship between equilibrium and rate properties for adsorbent materials.

It should also be clear that the present invention may be practiced with various deployments of adsorbents in the main adsorbent zone, e.g. layers and mixtures of adsorbents of various types or of the same type but with varying adsorption and/or physical characteristics. For example, the enhanced rate concepts of this invention could be applied to the layered beds suggested by Ackley in co-pending application Ser. No. 08/837,411, as well as Notaro et al (U.S. Pat. No. 5,674,311) and Watson et al (U.S. Pat. No. 5,529,610).

As indicated above, the present invention represents a significant advance in the art. Where the prior art had focused primarily on equilibrium properties such as loading (total $N_2$ capacity), $\Delta N_2$ loading (working capacity), and adsorption selectivity, the present invention considers sorption rate, and its relationship with equilibrium properties.

All of the concepts of this invention apply generally to a full range of process conditions, e.g. temperature, pressure, pressure ratio, feed velocity, etc. It is only necessary to evaluate the rate characteristics of the adsorbent at the process conditions of interest before applying these concepts in order to insure maximum process performance. Likewise, these concepts can be applied to single-bed as well as multi-bed processes operating with subatmospheric (VSA), transatmospheric (VPSA) or superatmospheric (PSA) cycles. The enhanced-rate concepts described here are not limited to any particular adsorber configuration and can be effectively applied to axial flow, radial flow, lateral flow, etc. adsorbers. The adsorbent may be constrained or unconstrained within the adsorber vessel.

Specific features of the invention are shown in one or more of the drawings for convenience only, as such features may be combined with other features in accordance with the invention. Alternative embodiments will be recognized by those skilled in the art and are intended to be included within the scope of the claims.

What is claimed is:

1. A process for the separation of nitrogen from a feed gas including nitrogen, said process comprising: contacting the gas in an adsorption zone with an adsorbent that is equilibrium selective for nitrogen and adsorbing nitrogen on said adsorbent, wherein said adsorption zone comprises an equilibrium selective adsorbent material selected from the group consisting of A-zeolite, Y-zeolite, NaX, mixed cation X-zeolite, chabazite, mordenite, clinoptilolite, silica-alumina, alumina, silica, titanium silicates, phosphates and mixtures thereof; and wherein said adsorbent has properties defined by the hyperbolic function:

(SCRR−0.22)*NML FoM≥2.5; wherein

SCRR=RR*$(d_{particle})^2$;

RR=$\Delta N_2(Y_F, Y_0)/(t_2-t_1)$;

$\Delta N_2(Y_F, Y_0)$=[$N_2$ Loading at p, $Y_F$]−[$N_2$ Loading at p, $Y_0$] at 300K;

$Y_F$, $Y_0$, $Y_2$ and $Y_1$ are mole fractions in the gas phase, and $t_2$ and $t_1$ are the times corresponding to $Y_2$ and $Y_1$ in the concentration front;

$d_{particle}$=the Ergun diameter of the adsorbent particle;

NML FoM=[$\Delta N_2(T,B)$]*[$\alpha_T(N_2/O_2)$]$^2$/[$\alpha_B(N_2/O_2)$] as measured at 300K;

$\Delta N_2(T,B)$=[$N_2$ Loading at $p_T$, $X_T$]−[$N_2$ Loading at $p_B$, $X_B$];

$\alpha_T(N_2/O_2)$=[$X_T(N_2)/X_T(O_2)$]/$Y_T(N_2)/Y_T(O_2)$];

$\alpha_B(N_2/O_2)$=[$X_B(N_2)/X_B(O_2)$]/$Y_B(N_2)/Y_B(O_2)$];

subscript T denotes the highest adsorption pressure, and subscript B denotes the lowest desorption pressure;

$X_T$ and $X_B$ are mole fractions of the indicated molecules in the adsorbed phase at the pressure denoted by the subscript; and $Y_T$ and $Y_B$ are mole fractions of the indicated molecules in the gas phase at the pressure denoted by the subscript.

2. The process of claim 1, wherein NML FoM is increased by increasing at least one of the following parameters: $\Delta N_2$ loading, $\alpha_T$ for the feed and the ratio [$\alpha_T/\alpha_B$] for regeneration.

3. The process of claim 1, wherein said adsorbents are X zeolites having mixtures of Li$^+$ and either alkali metals or alkaline earth metals or both.

4. The process of claim 3, wherein said adsorbents have a $SiO_2/Al_2O_3$ ratio of less than or equal to 5.0.

5. The process of claim 3, wherein said adsorbents have a $SiO_2/Al_2O_3$ ratio of less than or equal to 2.5.

6. The process of claim 1, wherein said adsorption zone is oriented radially, axially or laterally to the flow of said feed air.

7. The process of claim 1, wherein said adsorption zone comprises two or more adsorbent materials.

8. The process of claim 7, wherein said two or more adsorbent materials are in separate layers.

9. The process of claim 7, wherein said two or more adsorbent materials are mixed in a single layer or in more than one layer.

10. process for the selection of adsorbents for use in the separation of nitrogen from a nitrogen containing gas, said process comprising selecting adsorbents from the group consisting of A-zeolite, Y-zeolite, NaX, mixed cation X-zeolite, chabazite, mordenite, clinoptilolite, silica-alumina, alumina, silica, titanium silicates, phosphates and mixtures thereof; and wherein said adsorbent has properties defined by the hyperbolic function:

$$(SCRR-0.22)*NML\ FoM \geq 2.5\ SCRR=RR*[d_{particle}]^2$$

$$RR=\Delta N_2(Y_F, Y_0)/(t_2-t_1)$$

$\Delta N_2(Y_F, Y_0)=[N_2$ Loading at p, $Y_F]-[N_2$ Loading at p, $Y_0]$ at 300K;

$Y_F, Y_0, Y_2$ and $Y_1$ are mole fractions in the gas phase, and $t_2$ and $t_1$ are the times corresponding to $Y_2$ and $Y_1$ in the concentration front;

$d_{particle}$=the Ergun diameter of the adsorbent particle;

NML FoM=$[\Delta N_2(T,B)]*[\alpha_T(N_2/O_2)]^2/[\alpha_B(N_2/O_2)]$ as measured at 300K;

$\Delta N_2(T, B)=[N_2$ Loading at $p_T, X_T]-[N_2$ Loading at $p_B, X_B]$;

$\alpha_T(N_2/O_2)=[X_T(N_2)/X_T(O_2)]/[Y_T(N_2)/Y_T(O_2)]$;

$\alpha_B(N_2/O_2)=[X_B(N_2)/X_B(O_2)]/[Y_B(N_2)/Y_B(O_2)]$;

T=the highest adsorption pressure;
B=the lowest desorption pressure;
$X_T$ and $X_B$ are mole fractions of the indicated molecules in the adsorbed phase at the pressure denoted by the subscript; and
$Y_T$ and $Y_B$ are mole fractions of the indicated molecules in the gas phase at the pressure denoted by the subscript.

11. The process of claim 10, wherein NML FoM is increased by increasing at least one of the following parameters: $\Delta N_2$ loading, $\alpha_T$ for the feed and the ratio $[\alpha_T/\alpha_B]$ for regeneration.

12. The process of claim 10, wherein said adsorbents are zeolites having mixtures of $Li^-$ and either alkali metals or alkaline earth metals or both.

13. The process of claim 10, wherein said adsorbents have a Si/Al ratio of less than or equal to 5.0.

14. The process of claim 10, wherein said adsorbents have a Si/Al ratio of less than or equal to 2.5.

15. A process for the production of oxygen from air, comprising: contacting air in an adsorption zone with an adsorbent that is equilibrium selective for nitrogen and adsorbing nitrogen on said adsorbent, wherein said adsorption zone comprises an equilibrium selective adsorbent material whose intrinsic rate is correlated to that material's capacity.

16. A process for improving the performance of a given adsorbent material, said process comprising
   a) measuring said adsorbent's NML FoM equilibrium properties;
   b) solving the following equation for a minimum value of SCRR:

$(SCRR-0.22)*NML\ FoM \geq 2.5$;

wherein:
   $SCRR=RR*(d_{particle})^2$
   $RR=\Delta N_2(Y_F, Y0)/(t_2-t_1)$

NML FoM=$[\Delta N_2(T,B)]*[\alpha_T(N_2/O_2)]^2/[\alpha_B(N_2/O_2)]$ as measured at 300 K;

$\Delta N_2(T,B)=[N_2$ Loading at $p_T, X_T]-[N_2$ Loading at $p_B, X_B]$;

$\alpha_T(N_2/O_2)=[X_T(N_2)/X_T(O_2)]/[Y_T(N_2)/Y_T(O_2)]$;

$\alpha_B(N_2/O_2)=[X_B(N_2)/X_B(O_2)]/[Y_B(N_2)/Y_B(O_2)]$;

$Y_F, Y_0, Y_2$ and $Y_1$ are mole fractions in the gas phase, and $t_2$ and $t_1$ are the times corresponding to $Y_2$ and $Y_1$ in the concentration front;
   $d_{particle}$=the Ergun diameter of the adsorbent particle;
   T=the highest adsorption pressure;
   B=the lowest desorption pressure;
   $X_T$ and $X_B$ are mole fractions of the indicated molecules in the adsorbed phase at the pressure denoted by the subscript; and
   $Y_T$ and $Y_B$ are mole fractions of the indicated molecules in the gas phase at the pressure denoted by the subscript;
   c) preparing a material having a measured SCRR equal to or greater than said minimum value of SCRR by modifying synthesis of said adsorbent material such that morphology of said material is modified so as to change said material's SCRR.

17. An apparatus for measuring the rate at which an adsorbable material is adsorbed by an adsorbent, said apparatus comprising:
   a) an adsorbent bed;
   b) a source of oxygen and means for providing said oxygen to said adsorbent bed;
   c) a source of air or synthetic air mixture containing only $N_2$ and $O_2$ and means for providing said air or synthetic air mixture to said adsorbent bed;
   d) an oxygen analyzer downstream of said adsorbent bed for measuring the concentration of oxygen;
   e) a flow meter downstream of said adsorbent bed for measuring the flow rate of oxygen.

18. The apparatus of claim 17, further comprising a control valve located downstream of said adsorbent bed for maintaining a substantially constant pressure in said adsorbent bed.

19. The apparatus of claim 17, wherein endspace and connecting piping volumes of said apparatus are about 5% or less than the volume of said adsorbent bed.

* * * * *